United States Patent [19]
Nguyen et al.

[11] Patent Number: 6,163,818
[45] Date of Patent: Dec. 19, 2000

[54] STREAMING MEMORY CONTROLLER FOR A PCI BUS

[75] Inventors: Uoc H. Nguyen, Long Beach; Otto Sperber, Huntington Beach; Khanh Q. Tran, Irvine; David K. Bovaird, West Hills, all of Calif.

[73] Assignee: Xerox Corporation, Stamford, Conn.

[21] Appl. No.: 09/141,398

[22] Filed: Aug. 27, 1998

[51] Int. Cl.[7] ........................... G06F 13/00
[52] U.S. Cl. .............................. 710/22; 710/29
[58] Field of Search ................ 710/22–35, 107–130

[56] References Cited

U.S. PATENT DOCUMENTS

| | | | |
|---|---|---|---|
| 5,416,916 | 5/1995 | Bayle | 710/130 |
| 5,590,377 | 12/1996 | Smith | 710/22 |
| 5,875,351 | 2/1999 | Riley | 710/22 |
| 5,884,050 | 3/1999 | Wheeler et al. | 710/107 |
| 5,933,654 | 8/1999 | Galdun | 710/23 |
| 5,937,206 | 8/1999 | Nakamura | 710/22 |
| 5,978,866 | 11/1999 | Nain | 710/22 |
| 6,023,738 | 2/2000 | Priem et al. | 710/23 |

*Primary Examiner*—Christopher B. Shin
*Attorney, Agent, or Firm*—Robert Cunha

[57] ABSTRACT

In a system having a PCI bus, an additional memory attached to the bus to allow a higher speed of data transfer for a number of copies from the computer to a number of devices. The additional memory has a number of DMA channels, each associated with an I/O device. One copy of the data required by an I/O device is transferred to the memory at normal computer FIFO speed. Thereafter, multiple copies of that data can be transferred to the I/O device from the memory at the higher data bus speed.

5 Claims, 1 Drawing Sheet

STREAMING MEMORY CONTROLLER FOR A PCI BUS

BACKGROUND OF THE INVENTION

A modification to a standard PCI data bus arrangement for driving a high speed printer to allow a higher data rate by providing an additional bus memory, and its I/O, on the bus to serve as an intermediary between the main CPU memory and the I/O ports connected to the printer.

The industry standard PCI (Personal Computer Interconnection) bus will connect a computer to the other application boards in the system. The computer contains a CPU, main memory and cache, among other things, all connected to the bus through an interface chip comprising a FIFO, all standard off-the-shelf components. In a "post-write" transfer from any component on the PCI bus to the main memory, the component posts the address into which the data is to be written, and loads the data into the FIFO. The component can then go on with another activity, assuming that the data will eventually be DMA loaded into main memory. In a "-read" or "pre-fetch", the component must first specify the address in the memory from which the data must come, and then wait until the data is available from the FIFO. To speed up the process, in a "pre-fetch", if the computer knows what data the component will need, the FIFO can be loaded in advance.

To drive a high speed color printer which prints four color separations, there must be four I/O ports which transport data at high rates from the computer main memory to the printer through a FIFO register in the interface chip, and this single FIFO, along with the demands made by the CPU and the memory protocol, limits the throughput. The chip set could be modified to have an additional FIFO for each printer color separation. However, the entire computer chip set is an industry standard, so modification of the chip set is not an alternative. The question, then, is how to modify the system to allow a higher data throughput.

SUMMARY OF THE INVENTION

The solution is to provide an additional Memory Subsystem and its PCI Master (I/O) on the bus and transmit the document first from the CPU main memory to the additional Memory Subsystem at the lower FIFO speed, and then transmit the document on the PCI bus from the Memory Subsystem to the printer I/O ports at the higher bus speed.

Of course, in both cases, the time to transmit the entire document from the computer memory is limited by the speed of the FIFO, so there appears to be no advantage to adding the Memory Subsystem to the system in this case. However, this is only true for the first copy. If the printer is making more than one copy, then for each additional copy the time required is much smaller since the transfer is only from the Memory Subsystem to the printer ports along the faster bus path.

In actual practice, whenever the printer is making additional copies of a current document and the computer is not otherwise occupied, the computer can be loading next documents into the Memory Subsystem. Thus, all copies of the document are being received by the printer from the Memory Subsystem through the PCI bus, and the data can be supplied in real time as needed by the printer.

BRIEF DISCUSSION OF THE DRAWINGS.

FIG. 1 is a block diagram of the system.

DETAILED DESCRIPTION OF THE INVENTION

Figure 1:
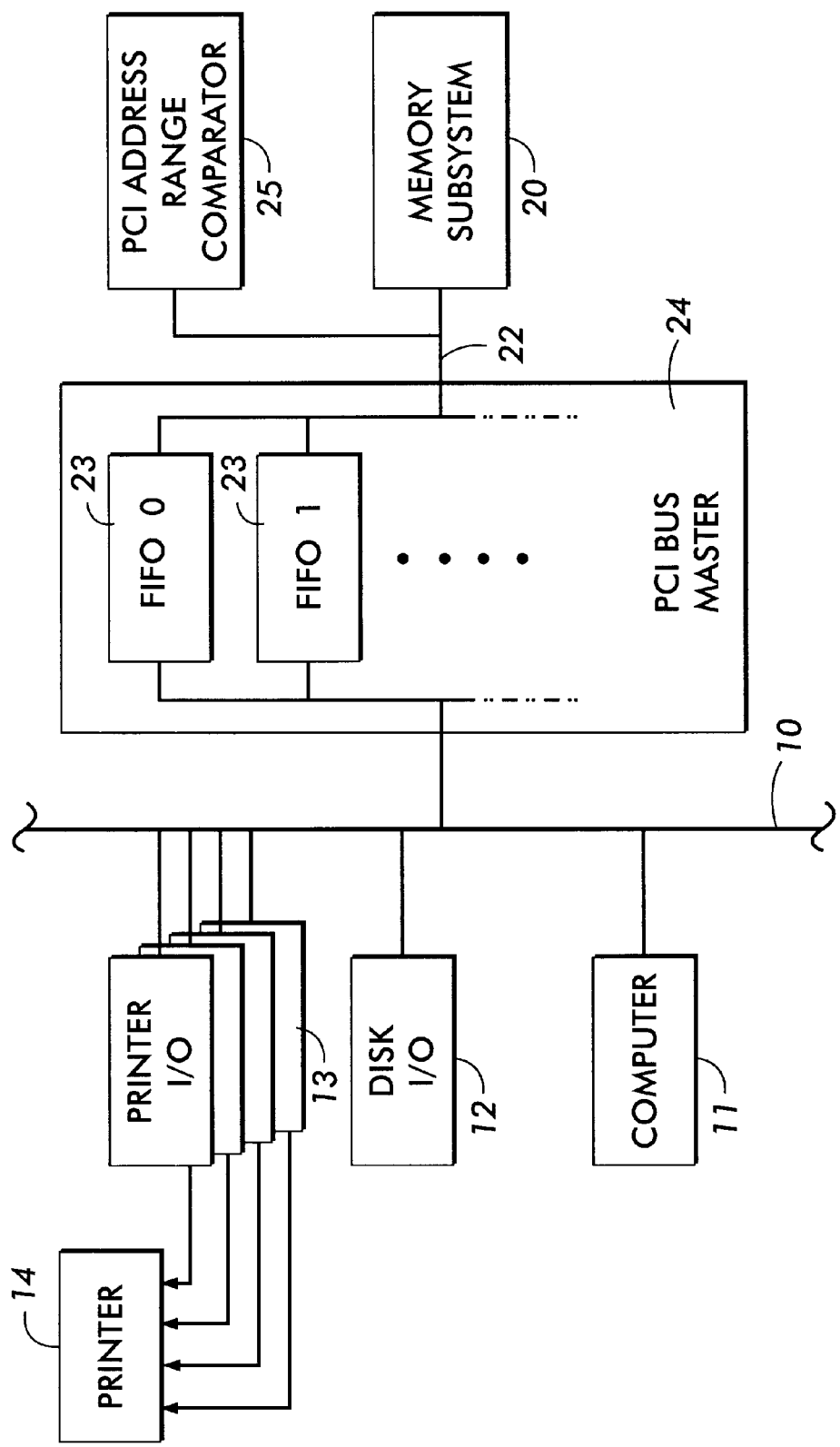

FIG. 1 shows the arrangement of all of the components as they are connected to the PCI bus 10. The industry standard computer 11 has a CPU, a main memory and a FIFO and is made up of one chip or a chip set. Other typical components are connected to the bus such as a disk I/O 12. These components can be thought of as masters or slaves. The masters keep track of memory addresses during reads and writes, while the slaves do not. Thus, a slave will ask for an amount of data starting at a starting address in memory, and will expect to get it in the proper order. The master accesses and transmits the data blocks, and keeps track of the memory addresses so that the data will be transmitted in the proper order. Four printer I/O cards 13, one for each separation, are master components and are attached directly to the bus as shown, and to the printer 14.

Added to these standard components is a Memory Subsystem 20, connected to the bus by the PCI Bus Master 24 having a number of FIFO's 23, eight in this example, four being dedicated to the four printer I/O cards 13, which are slave components. When printer I/O is to write data into the Memory Subsystem 20, the I/O will specify a starting memory location in the Memory Subsystem and put the data block in the FIFO. The I/O is then free to do something else, while the data is being DMA transferred to the Memory Subsystem. Similarly, when the I/O needs to receive data, the I/O will transmit the address of the block, and wait until the data is loaded into the FIFO. The data is then transmitted from the FIFO to the I/O in burst mode. The Memory Subsystem 20 and the FIFO's 23 are connected by an internal bus 22.

If the PCI Bus Master 24 is accessing status, or some other kind of information, it will be a random read of a word, half word or byte, and it will not be in burst mode. If the status information is a larger quantity comprising several words, the burst mode can be used. This will be called a burst random access. If it is video data to be printed, it will normally be in the form of contiguous data in a large quantity, and the burst mode is assumed.

In the example of FIG. 1, eight high speed streams of data are enabled. A data stream is defined as PCI write stream for storing data into the Memory Subsystem and a PCI read stream for reading data from the Memory Subsystem. A data stream is defined by a transfer direction (PCI write or read stream), a range of 512 to 4 M bytes, and a starting address. Consecutive data is assumed. Therefore current address bits are maintained by the FIFO's 23. The implementation will also have the PCI configuration memory required for plug-and-play. The implementation will conform to the PCI specification rev. 2.x and up.

As an additional form of data checking, the PCI Master has a PCI Address Range Comparator 25, in which is stored an address range in the Memory Subsystem for the data that may be transmitted to or from each printer I/O 13 card. Each address is checked for direction and location here before a transmission is allowed.

A more detailed description of the invention follows:

1. PCI Write Streams

When a PCI Master does a burst write to the Memory Subsystem:
 a. The PCI Address is compared with the addresses of the eight ranges, to determine if it is the address AND the direction are the same as programmed,
 b. Data will be buffered into the stream FIFO, i.e., all writes are posted. However, the PCI address is not buffered.
 c. Exception cases
  If the FIFO is full as the beginning of the PCI burst, the retry cycle will be issued to the PCI initiator. A disconnect acknowledge could also be utilized, but it is assumed that the PCI Master will come back with the same address.

If the FIFO becomes full in the middle of the PCI burst write, a Target-Not-Ready or a Disconnect acknowledge will be issued. If the Target-Not-Ready is issued by the chip, the whole PCI bus will be on hold until the memory writing is activated and some data is moved out of the stream FIFO. If a Disconnect acknowledge is issued, the PCI Bus Master will release the PCI bus and will come back later with the same address as before.

d. For most of the time, the memory writing will be done at a later time, and is decoupled from the PCI transfer.

The direction is also checked along with the address because it is conceivable that two stream could have the same address range but with different directions.

2. PCI Read Streams

All read stream data is prefetched. The prefetching will occur as long as the internal FIFOs have space. When a PCI Master does a burst read to the Memory Subsystem:

a. The PCI Address is compared with the addresses of the eight ranges. To determine if it is the address AND the direction are the same as programmed, b. data, for most of the time, will be already available in the stream FIFOs, and the burst read will happen at the highest rate on the PCI bus.

c. Exception cases

If the FIFO is empty a retry cycle will be issued to the PCI initiator. A disconnect acknowledge could also be utilized, but it is assumed that the PCI Master will come back with the same address.

If the FIFO becomes empty in the middle of the PCI burst read, a Target-Not-Ready or a Disconnect acknowledge will be issued. If the Target-Not-Ready is issued by the chip, the whole PCI bus will be on hold until the memory writing is activated and some data is moved out of the stream FIFO. If a Disconnect acknowledge is issued, the PCI Bus Master will release the PCI bus and will come back later with the same address as before.

d. For most of the time, the memory reading will be done at an earlier time, and is decoupled from the PCI transfer.

The prefetch is based on the FIFO status; a memory read will occur as long as the FIFO is not fill.

3. PCI Non-Stream or Random Writes

For a random PCI write, the PCI address is compared with the eight address ranges. If the initiator address is not one of the address ranges but still within the range assigned to the memory, the address and the data are buffered into the random write FIFO. A PCI random write is always posted. The memory writing will occur at a later time, independent of the PCI write cycle.

4. PCI Non-Stream or Random Reads

For a random PCI read, the PCI address is compared again with the eight address ranges and the total range of the memory. If the address is not in one of the ranges but it is within the range assigned to this memory, a memory cycle will be started as soon as possible. The data from the memory array will be written into the random read FIFO, then soon after delivered to the PCI bus. Any random read is not prefetched, unlike the stream reads which are always prefetched. Waiting for the random read data from the memory, the chip can issue:

a PCI retry acknowledge, where the PCI bus Master will release the bus and come back later with the same address, or a PCI "Target-not-Ready where the PCI bus Master will wait and keep the PCI bus.

5. Non-Linear or Block Transfer Mode

At least two streams will have this capability. Block transfer mode is the mode where data is in a block form such as a square 32-byte by 32-byte, or a rectangle of 32-Byte by 16-Byte. This form of data is required for certain imaging functions such as rotation, or JPEG compression, etc.

The block size (length and width) are programmable; implicitly the form (square or rectangular) is defined by the programmed length and width.

If the block mode is programmed for a PCI write stream, the input data is in scanline form, and the content of the memory is in block form. The read stream should be programmed as non-conversion.

If the block mode is programmed for a PCI read stream, the content of the memory is in the scanline form, and the read data is in the block form. The write stream channel should be programmed as non-conversion.

6. CCB Fetch

A Chained Control Block (CCB) are the control words necessary for the stream channel to be functional. The CCP contains the source address, the destination address, the direction (stream read or write), the transfer count, the packet size etc. This information is needed for the chip to execute posted write or to prefetch the stream read data.

The first CCB of a stream channel is always set up by a PCI bus Master. If the CCB is programmed as chained, the chip will automatically fetch the next CCB and execute it. It is assumed that the CCBs were already stored in the Memory Subsystem by a PCI bus master. The CCBs are written into the memory by PCI random write accesses defined previously.

A CCB can also be paused i.e., the execution of it depends on a state of a control bit setable by a PCI bus Master.

The CCB chain/pause are implemented in the XSB1 and XPC1 chips.

The Intelligent Memory Controller

The Intelligent Memory Controller will execute the following tasks:

arbitrates the requests for service of the eight streams, of the random PCI write and/or read, and the eight CCB fetch requests.

interfaces with the DRAMs to:
burst write data (page mode) into the memory from the posted PCI write FIFO's,
burst read data (page mode) or prefetch data for the PCI Read stream FIFOs,
random write or read data for the PC1 random memory accesses,
fixed burst read for CCB fetch request of the eight streams,
refresh the memory (Cas-before-Ras)

1. Arbitration of the Requests

The arbitrator 24 receives as inputs:
eight requests from the eight stream FIFOs; these requests are FIFONotFull for PC1 Read stream FIFOs, or FIFONotEmpty for PC1 Write stream FIFOs;
a request of a Random PC1 read,
the FIFONotEmpty of the Random PC1 Write FIFO,
eight CCB fetch requests,
The DRAM refresh.

The priority of the arbitration is as follows:
the DRAM refresh request (highest priority)
the pending random PCI read
the FIFONotFull of the PCI Read stream FIFOs the pending random PCI write the FIFONotEmpty of the PC1 Write stream FIFOs the eight CCB Fetch requests from the eight stream FIFOs 2. DRAM Controller
   a. DRAM Transfer Types
      for all stream related, the DRAM is accessed in the page mode with the lower address bits maintained by the chip; the data is stored or read from the stream FIFOs the CCB fetch is a fixed 4-word burst read; and the data is stored into the internal CCB static RAM the RAS is kept active and only deactivated if the row address of the next access is different than the previous one;

the DRAM controller will be able to handle non-interleaved as well as interleaved banks (at least two banks)
   b. DRAM Physical Interfaces
      The DRAM controller should be able to interface directly with several types of DRAMs such as normal, EDO, and Synchronous DRAMs. The type of DRAM is programmable after reset.

The DRAM technology is also programmable such that 256 Kbit, 1 MBit, 4 Mbit, or 16 Mbit DRAM can be utilized.

The DRAM interface width should be 32-bit minimum.

Random Versus Stream Operations

In the normal PC1 activity, a CPU can randomly access the data that is being streamed. There are two problems to be solved:

1. How to distinguish between a random access and a stream access?
2. Data consistency where the data is in one of the streaming FIFOs, internal to this chip, when that same data is being randomly accessed.

1. Stream and Random Access Distinction

There are several ways to recognize the stream against the random accesses such as:

restriction: no random access is allowed into the active stream areas. A stream is active when there is data transferring in or out of that memory region. Any access to these active areas is considered as stream access.

memory mapping: the memory space covered by the chip will be divided into two areas, one for stream and one for random.

1a. Distinction Through Restrictions

The CPU should only access the data or inquire the status of the streaming data transfer when the transfer is complete. The stream address range as well as the operation status (complete, in progress, etc.) are available from the chip0. Therefore, the CPU needs to check the status of the stream channel before accessing the stream data.

The restriction will also solve the problem of data consistency when the CPU is accessing data that is temporarily in the internal FIFOs of the chip.

Any access to data that is not presently in one of the eight ranges of the stream FIFOs is considered random. The internal address comparator will be able to detect this condition easily.

If the write address is detected as random, i.e., not in one of the eight ranges, the write data will be posted in the random write FIFO, and the memory write will occur after the request arbitration.

If the read address is not in one of the eight ranges, i.e., detected as random, there will be two possibilities:

a. for a random Prefetch read: the chip will issue a retry or disconnect acknowledge, and if will get the needed data as soon as possible into the random read FIFO, or b. for a Non-prefetch read: the chip will issue a Target Non-Ready, and the PCI master will have to wait until the memory read data is read out of the DRAMs.

If the random read or write address falls in one of the eight stream address ranges, the chip will consider that access as stream, and the data will be delivered from the FIFO.

1b. Distinction Through Address Mapping

In this method, the highest address bit could be used to distinguish between stream and random/IO accesses. Effectively, the whole PCI Memory space is divided into two spaces, one for streaming data, and one for IO or random accesses.

2. Data Consistency

If there is no restriction on the software on when a PC1 but Master can randomly access the memory, the data consistency must be solved. There are two main cases:

A. a random access that has the same address of a data presently in one of the eight stream FIFOs.

B. a streaming cycle that has the same address of a data presently in one of the random read write FIFOs.

The address comparison block of the chip can detect easily if a given address is in one of the eight ranges or in one of the eight stream FIFOs.

The following cases will be covered:

A. Random access with same data already in Stream FIFOs
   1. PC1 Single Random Write access to data already in:
      stream read FIFO
      stream write FIFO
      both stream read and write FIFOs
   2. PCI Single Random Read access to data already in:
      stream read FIFO
      stream write FIFO
      both stream read and write FIFOs
   3. PCI Burst Random Write access to data already in:
      stream read FIFO
      stream write FIFO
      both stream read and write FIFOs
   4. PCI Burst Random Read access to data already in:
      stream read FIFO
      stream write FIFO
      both stream read and write FIFOs B. Stream access with same data already in random FIFOs
   1. PCI Stream Random Write access to data already in:
      stream read FIFO
      stream write FIFO
      both stream read and write FIFOs
   2. PCI Stream Random Read access to data already in:
      stream read FIFO
      stream write FIFO
      both stream read and write FIFOs A. Random Access with Data Already in Stream FIFO a. PCI Single (Non-Burst) Random Write Access If the random address is a 'hit' i.e., there is data corresponding to the same address in one or more stream FIFOs. There are several cases:

if the same data is also in the stream read FIFO: the data in the stream read FIFO is updated, and the PCI write data will be posted into the random write FIFO.

if the same data is also in the stream write FIFO: the data in the stream write FIFO is updated, and the write operation to the memory is cancelled. The update will be done later by the write stream anyway.

if the same data is also in both stream read AND write FIFOs, the data in both stream write and read FIFOs is updated, and the memory write corresponding to the PC1 write is cancelled. The memory data will be updated by the PC1 stream write anyway at a later time.

Note: If the random write FIFO can accept more than one posted write, and if there are consecutive writes and reads to a same address, the data read can not be guaranteed to be the latest version.

The Random write FIFO could be implemented such that only one random write is posted, and the software will make sure that the posted random write is performed before doing a random read to the same location.

b. PC1 Burst Random Write Access

If the random address is a 'hit' i.e., there is data corresponding to the same address in one or more stream FIFOs. There are two main cases:

i. the burst data is entirely contained within the stream FIFO:

if the same packet data is also in the stream read FIFO: the data packet in the stream read FIFO is updated, and the burst PC1 write data will be posted into the random write FIFO.

if the same packet data is also in the stream write FIFO: the packet data in the stream write FIFO is updated, and the write operation to the memory is cancelled. The update will be done later by the write stream anyway.

if the same packet data is also in both stream read AND write FIFOs, the packet data in the stream write FIFO is updated, and the memory write corresponding to the PCI write is cancelled. The memory data will be updated by the PC1 stream write anyway at a later time.

Note: If the random write FIFO can accept more than one posted write, and if there are consecutive writes and reads to the same address, the data read can not be guaranteed to be the latest version.

The Random write FIFO could be implemented such that only one random write is posted, and the software will make sure that the posted random write is performed before doing a random read to the same location.

ii. the burst data is partly contained within, and partly contained outside the stream FIFO:

if the 'hit' packet data is also in the stream read FIFO: the part that is overlapped with the packet in the stream read FIFO will be updated and the entire burst will be posted in the random write FIFO.

if the packet data is also in the stream write FIFO: the part that is overlapped with the packet in the stream read FIFO will be updated, and the entire burst will be posted in the random write FIFO. The memory write cycle is not cancelled as in the previous case.

if the packet data is also in both stream read AND write FIFOs, the part that is overlapped with the packet in the two stream FIFOs will be updated, and the entire burst will be posted in the random write FIFO. The memory write cycle is not cancelled as in the previous case.

c. PCI Single (Non-Burst) Random Read Access

If the random address is a 'hit' i.e., there is data corresponding t the same address in one or more stream FIFOs. There are several cases:

if the data address is a 'hit' on a stream read FIFO i.e., data is in one of the stream read FIFOs: that data will be 'copied' from the stream read FIFO to the random read FIFO, and the PCI random read proceeds from the random read FIFO. No DRAM operation is needed.

if the data address is a 'hit' on a stream write FIFO, the data is 'copied' from the stream write FIFO to the random read FIFO, and the PC1 random read proceeds from the random read FIFO. No DRAM operation is needed.

if the same data is also in both in one of the stream read AND stream write FIFOs: this case should not happen: if the data is in both read and write streams, the streams are overlapping, i.e., data is being written and read from the same memory space. If this case is detected, an error interrupt could be generated.

d. PCI Burst Random Read Access

If the random address is a 'hit' i.e., there is data corresponding to the same address in one or more stream FIFOs. There are two main cases:

i. the burst data is entirely contained within the stream FIFO:

if the same packet data is also in the stream read FIFO: the part that is overlapped will be 'copied' from the stream read FIFO to the random read FIFO, and the rest of the burst will be read from the memory. The PCI read data can be delivered to the PCI bus master just after the data is moved into the stream FIFO, and at the same time a memory read is started ASAP. If the non-overlapped part of the read data packet is late (does not get fetched into the random read FIFO in time) from the memory, the chip will issue 'Target not Ready' until all data is fetched.

if the same packet data is also in the stream write FIFO: the overlapped part of the data packet is 'copied' from the stream write FIFO to the random read FIFO, and the PCI random burst read can start immediately, and at the same time a memory read cycle is started as soon as possible. If the non-overlapped part of the read data packet is late (does not get fetched into the random read FIFO in time) from the memory, the chip will issue 'Target not Ready until all data is fetched.

if the same packet data is also in both stream read AND write FIFOs, the packet data in the stream write FIFO is updated, and the memory write corresponding to the PCI write is cancelled. The memory data will be updated by the PCI stream write anyway at a later time.

B. Stream Access with Data Already in Random FIFO(s)

a. PCI Stream Write Cycle

If the Stream Write address is a 'hit' i.e., there is data corresponding to the same address in one of the two random FIFOs or both. For the stream case, the Hit on the address only occurs when the stream data is already fetched from the memory into the chip. There are several subcases:

if the same data is also in the random read FIFO: the data, just fetched from the memory into the stream write FIFO, is updated, and the PCI Stream Write will be processed as usual.

if the same data is also in the random write FIFO: the data being in the random FIFO is implicitly newer than the one in the memory. Therefore, the stream data will be fetched from the memory into the stream FIFO and then updated with the data from the random write FIFO.

if the same data is also in both stream read AND write FIFOs, the data in both random write and read FIFOs is updated, and the PCI Stream Write will be processed as usual.

b. PCI Steam Read Cycle

If the Stream Read address is a 'hit' i.e., there is data corresponding to the same address in one of the two random FIFOs or both. For the stream case, the hit on the address only occurs when the stream data is already fetched from the memory into the chip. There are several subcases:

- if the same data is also in the random read FIFO: the data, being in the random FIFO is implicitly older than the data just being fetched by the stream access; therefore, the data in the Random FIFO is updated with the data from the stream access. Both accesses, random and stream, will proceed as usual.
- if the same data is also in the random write FIFO: the data being in the random FIFO is implicitly newer than the one in the memory. Therefore the stream data will be fetched from the memory into the stream FIFO and then updated with the data from the random write FIFO. The two accesses, one random write and one stream read will proceed as usual.
- if the same data is also in both stream read AND write FIFOS, the data in both random write and read FIFOs is updated, and the PCI accesses will be processed as usual.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. In a system which uses a data bus to transmit data from a computer to a number of I/O means, the improvement comprising:

an additional memory means connected to the bus to create an additional path for data transmission between the computer and the I/O means comprising:

a memory for storing the data, and a number of DMA channels, each channel comprising a data storage means for transmitting data between the memory and the bus, each data storage means:

a. being associated with an I/O means, and b. adapted to calculate the address of the memory location being accessed by the associated I/O means.

2. The system of claim 1 further comprising:

an arbitor responsive to an instruction from the computer for determining which data storage means will have access to the data bus, so that data may flow from the computer through the associated data storage means to the memory, and then from the memory through the associated data storage means to the I/O means.

3. The system of claim 1 wherein:

a data storage means is adapted to obtain data needed by the associated I/O means from the memory before receiving the request for the data by the associated I/O means.

4. The system of claim 1 wherein:

a data storage means is adapted to request that data be loaded into the memory, and load the data into the associated data storage means before the data is loaded into the memory.

5. The system of claim 1 wherein a data request from an I/O means for a data transfer in either direction comprises a memory location address, and wherein the system further comprises a comparator for testing the memory address to determine if it is within the correct range of addresses for that I/O means.

* * * * *